(12) United States Patent
Zamir (10) Patent No.: US 11,170,736 B2
(45) Date of Patent: *Nov. 9, 2021

(54) PRESERVING DESKTOP STATE ACROSS LOGIN SESSIONS

(71) Applicant: VMware, Inc., Palo Alto, CA (US)

(72) Inventor: Tal Zamir, Haifa (IL)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/289,934

(22) Filed: Mar. 1, 2019

(65) Prior Publication Data

US 2019/0197991 A1 Jun. 27, 2019

Related U.S. Application Data

(63) Continuation of application No. 15/057,037, filed on Feb. 29, 2016, now Pat. No. 10,249,266.

(51) Int. Cl.

| *G06F 3/048* | (2013.01) |
| *G09G 5/14* | (2006.01) |
| *G06F 9/46* | (2006.01) |
| *G06F 3/0481* | (2013.01) |

(52) U.S. Cl.
CPC .............. *G09G 5/14* (2013.01); *G06F 9/461* (2013.01); *G06F 3/0481* (2013.01); *G09G 2340/0407* (2013.01); *G09G 2354/00* (2013.01)

(58) Field of Classification Search
CPC ................ G06F 3/0481; G06F 9/461; G09G 2340/0407; G09G 2354/00; G09G 5/14
See application file for complete search history.

(56) References Cited

U.S. PATENT DOCUMENTS

| 2005/0109828 | A1* | 5/2005 | Jay ........................ G06F 9/4451 235/375 |
| 2006/0265417 | A1* | 11/2006 | Amato .................. G06F 16/951 |
| 2007/0079255 | A1 | 4/2007 | Gourdol |
| 2007/0162779 | A1* | 7/2007 | Downer ..................... G06F 1/24 713/340 |
| 2008/0034307 | A1* | 2/2008 | Cisler ................. G06F 3/04815 715/764 |
| 2009/0204966 | A1 | 8/2009 | Johnson |
| 2010/0153544 | A1 | 6/2010 | Krassner |
| 2011/0246922 | A1* | 10/2011 | Koenig ................... G06F 9/461 715/771 |
| 2014/0218385 | A1 | 8/2014 | Carmi |
| 2017/0017381 | A1* | 1/2017 | Wei ..................... G06F 3/04847 |

* cited by examiner

*Primary Examiner* — Thanh T Vu (57) ABSTRACT

Techniques are described for preserving desktop state between login sessions in desktop computing environments. During an active login session of a desktop by a user, the system intercepts all requests to open a file and records the requested file paths. The information can be recorded locally or at a remote location, such as a server accessed over a network connection. Before the login session is terminated, the system determines all open windows and captures a screenshot of each window that is open on the desktop at the time of terminating the login session. The location of each window is also determined and recorded along with the screenshots before the session is terminated. When the user starts a new active login session at a later time, the state of the desktop is restored using the recorded file paths, screenshots and window locations.

20 Claims, 6 Drawing Sheets

PRESERVING DESKTOP STATE ACROSS LOGIN SESSIONS

CLAIM OF PRIORITY

This application claims priority to and is a continuation of U.S. patent application Ser. No. 15/057,037, filed on Feb. 29, 2016, by Tal Zamir, entitled "PRESERVING DESKTOP STATE ACROSS LOGIN SESSIONS", which is incorporated herein by reference in its entirety.

TECHNICAL FIELD

The present disclosure generally relates to desktop computing environments and more particularly relates to preserving the state of a desktop including open applications, windows and documents across multiple login sessions.

BACKGROUND

Users often utilize a personal computer or other device to access a desktop environment, which traditionally provides a graphical user interface (GUI) including multiple icons, windows, toolbars, applications and documents. In some cases, the desktop is provided by the operating system, such as Microsoft Windows running locally on the user's personal computer. In other scenarios, such as in the case of virtual desktops, the desktop is running on a remote server, where the user's device is able to access the desktop over a network connection. In virtual desktop environments, the main logic and processing occur on the server and only the display information and user entry commands are communicated between the server and the user's device.

In desktop environments, a user working on their desktop may perform a number of actions, such as launching applications; visiting multiple websites and keeping them open in several tabs; opening documents and scrolling through those documents while making modifications; arranging application windows in a particular way; and the like. All these user actions result in a desktop state accumulated during the login session. Often, the user's login session needs to be terminated and the user may have to log back in either immediately or at a later time. In either case, the desktop state that the user had accumulated is lost, i.e., application windows, browser tabs and documents have been closed, window arrangements have been lost, etc. This results in a loss of productivity for the user since the user needs to manually restore the previous session.

There exist some tools that attempt to address a situation that occurs after a system reboot, which is sometimes required after making a modification to the operating system. For example, certain operating systems provide restart management application programming interfaces (APIs) which allow applications to be re-opened after a restart of the OS. Microsoft provides one such mechanism called "Restart Manager" API for the Windows OS that enables an application to be re-launched with certain parameters after a system restart takes place. However, this mechanism generally requires cooperation from software vendors in changing the code of their applications to support this API. In many cases, this is inconvenient and in fact not many vendors have implemented support for this API, which limits the applicability of this solution. There are also a number of other tools for re-opening applications, however such tools are limited various ways and presently there exists no comprehensive solution that is efficient, easy to use and which addresses all aspects of restoring desktop state between login sessions.

DETAILED DESCRIPTION

Systems and methods in accordance with various embodiments of the present disclosure overcome at least some of the above mentioned shortcomings and deficiencies by providing an improved mechanism for preserving desktop state between login sessions in desktop computing environments. In particular, embodiments described herein enable the system to re-open applications and windows, reinstate window arrangement and locations, and otherwise fully restore the desktop state in the event that a login session is terminated and a new login session is started.

Figure 1:
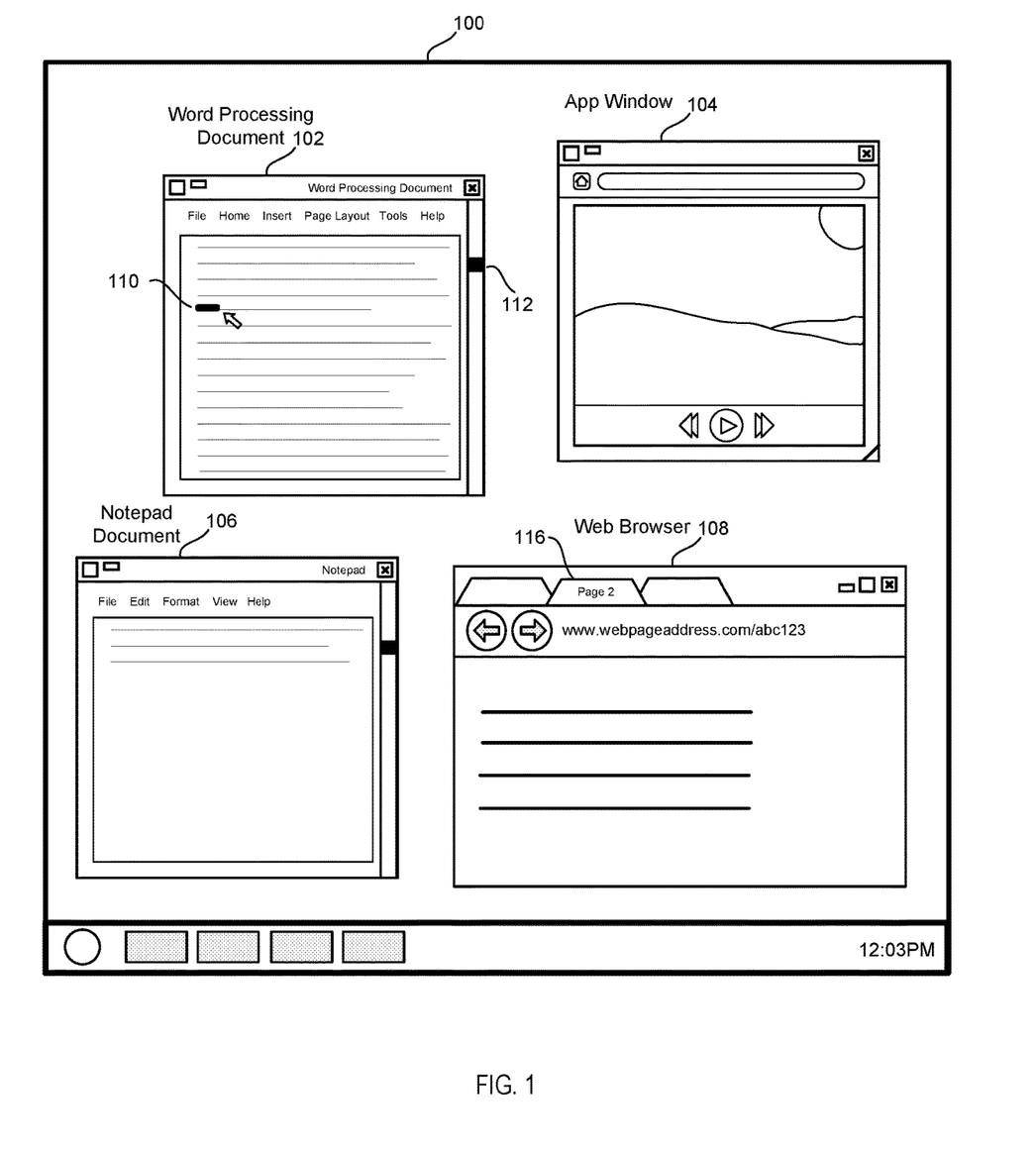
FIG. 1 illustrates an example of a desktop computing environment during an active login session, in accordance with various embodiments.

In various embodiments, during an active login session of a desktop by a user, the system intercepts all requests to open a file and records the path of the file that has been requested. This information can be recorded by an agent operating in the background while the user is using the desktop. The information can be stored locally or at a remote location, such as a server accessed over a network connection. Subsequently, when the login session is being terminated, the system walks through all of the open windows and captures a screenshot of each window that is open on the desktop at the time of terminating the login session. The location of each window is also determined and recorded along with the screenshots before the session is terminated. When the user starts a new active login session at a later time, the state of the desktop can be restored using the recorded file paths, screenshots and window locations. For those applications that support some form of restart management APIs provided by the operating system (OS), such as the Windows Restart Manager API, the agent can restore the applications by invoking the APIs. For applications that are not supported by the restart management APIs of the OS, the agent can start a new process per application window, display the saved screenshot of the application and a list of options per file that was originally opened during the last login session by that application. For Office suite documents, such as word processing documents, spreadsheets and the like, the agent can re-open the document using the APIs provided by the Office software suite. Similarly, open browser tabs can be restored by accessing web-browser specific APIs and file explorer windows can be re-opened using explorer shell APIs. In all cases, the positions of the restored windows are set to be the same as FIG. 1 illustrates an example of a desktop computing environment during an active login session, in accordance with various embodiments. As previously mentioned, a typical user working on his/her desktop will usually perform some or all of the following actions:

Launch applications (e.g. Microsoft Word, Adobe Acrobat, Microsoft Visio,).

Visit websites and keep them in multiple tabs in a web browser (one tab per website).

Open Office documents (e.g. Microsoft Word, Excel, Powerpoint, etc.), scroll through those documents and perhaps modify them.

Open local folders to view the list of files in them (e.g. in File Explorer).

Arrange application windows in a certain way (e.g. side-by-side).

All of these actions result in a "desktop state" that is accumulated for the user's login session. For example, FIG. 1 illustrates a point in time of the desktop 100, where the user has a number of windows open, including a word processing document 102, an application 104, a Notepad document 106 and a web browser 108. The user may be actively editing the word processing document 102, at a particular place in the document, as indicated by the position of the scroll bar 112 and the location of the cursor 110. The web browser 108 may contain several different tabs, such as tab 116, each tab containing a web site. All of the windows (102, 104, 106 and 108) are arranged in a certain layout on the screen with each window having a particular position.

In some cases, the user's login session must be terminated. There are many examples where this termination might be necessary. In one example, the user may be instructed by their employer's IT department to log off or shut down the machine at the end of the day. Alternatively, the user's computing device may have malfunctioned and needs to be rebooted. In another scenario, the user's session may not be responding (e.g., an application error is causing the session to hang) and the user must log off. Even if there has been no error, many operating system (OS) updates deployed to the user's machine require a reboot in order to complete the operation. If the update is critical enough, the reboot may actually be forced upon the user by the OS. In the case of virtual desktops, the virtual desktop infrastructure (VDI) system may decide to forcefully log off the user and discard his/her virtual machine (VM) that hosts the desktop in order to reduce processing load and improve performance. Yet another possibility is that the user's desktop image may be migrated to a different physical machine (e.g. upon hardware refresh, OS migration, or when migrating the user's physical device to a virtual machine in the cloud).

Conventionally, in all of these cases, the user's state would normally be lost upon next login—applications would be closed, browser tabs would be closed, documents would be closed (including the last location in those documents), open local folders would be closed and the window arrangement would be lost. This results in loss of productivity for the user as he/she would need to manually restore the session back to its original state. Additionally, the user may forget or completely lose track of important items they had been working on and this can potentially result in significant business loss.

The various embodiments described herein enable the system to preserve the desktop state between login sessions such that the information noted above is not lost. In order to accomplish this, the system records certain information during the active login session and just before terminating the login session. For example, during the active login session, whenever a user opens a file with the "Open File" dialog, the system intercepts that dialog and records the path of the file that was opened by that process. This function can be performed by an agent operating in the background on the computing device in such a way that the user is not aware of the agent. In one embodiment, the agent may take the form of a filter driver that calls out to some custom code that intercepts any "Open File" requests from the application to the operating system and records the file paths that are requested by the application. In one embodiment, the file paths may be stored locally on the computing device. In other embodiments, the file paths may be transmitted to a remote server over a network connection (if one is available) and stored on the server.

At some point, the system may detect that the login session is being terminated. This may be as a result of normal day-to-day activities by the user, or it may be unexpected, such as in the case of application errors or crashes. In either case, before the user session is terminated, the agent walks through all of the open windows and captures a screenshot of each window as well as the window's location and the window's process executable (along with the process launch arguments). For Office applications (e.g., word processing application used to edit document 102), the agent uses the API exposed by the Office software suite to determine the open documents and the locations in those documents. In one embodiment, the location in the document may include the position of the cursor 110 within document 102. For any open browsers, the agent can use browser-specific APIs to determine the open tabs and the web sites displayed on those open tabs. For file explorer windows (e.g. open folders), the agent can use explorer shell APIs to determine the open windows.

In various embodiments, the following components or code modules may be used to preserve the state of the desktop between login sessions: a component for capturing screenshots of currently open windows; a component for parsing restart management API data (e.g., Microsoft's "Restart Manager" data); a component for detecting windows locations; a component for determining the processes for each window and the arguments passed to those processes on launch; a component for collecting open windows (e.g., Microsoft's "Windows Explorer" windows); a component for collecting open web browser tabs (e.g., Microsoft's Internet Explorer, Chrome, Firefox); a component for collecting open Office documents and the location in each document (e.g., using the Microsoft Office APIs); and a component for hooking the "Open File" common dialog to collect the list of files opened in a certain application. It should be noted that all of the above functionality need not be separated into separate modules or components, as shown above. The functions above may instead be combined and/or further subdivided in many different ways, as will be evident to one of ordinary skill in the art.

In various embodiments, the collected information is uploaded to a server over a network connection or saved locally on the computing device of the user (similarly to the recorded file paths). All of this information can subsequently be used to restore the desktop state at a later time when a new login session is established.

Figure 2:
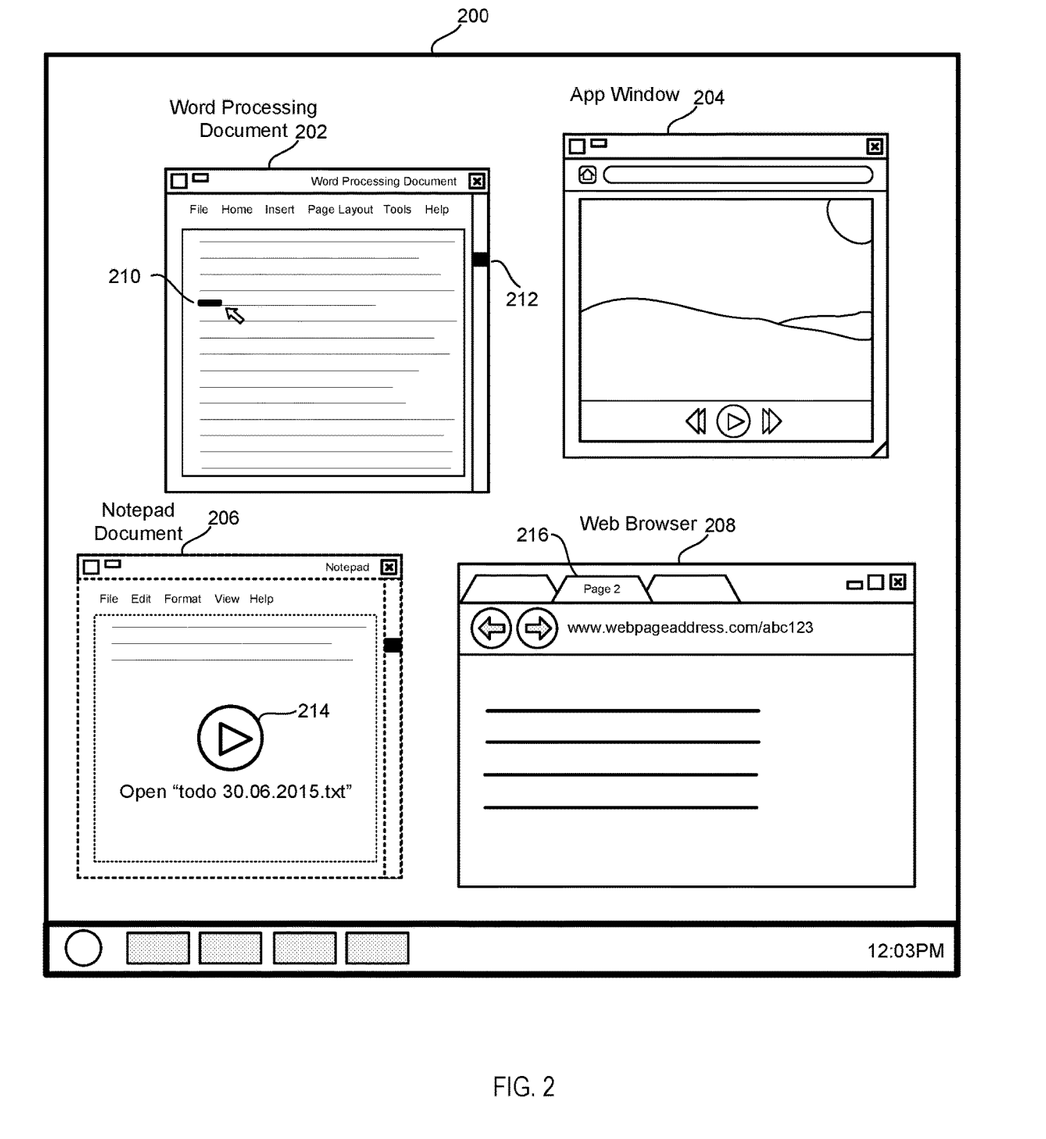
FIG. 2 is an example of a desktop computing environment after the desktop state of the login session has been restored, in accordance with various embodiments.

FIG. 2 is an example of a desktop computing environment after the desktop state of the login session has been restored, in accordance with various embodiments. Assuming that during the previous login session, the user had the windows open that were shown in FIG. 1, once a new login session is established, the state of the desktop 200 can be restored, including re-opening windows 202, 204, 206 and 208, as shown in FIG. 2.

For previously open applications that support the restart management APIs of the OS (e.g., Microsoft's Restart Manager API), these applications will be automatically relaunched with the same set of documents that were open before the session was terminated. For some of these applications, if a well-known API exists for getting and setting document location cursor (e.g. location in a word processing document), these applications will automatically scroll into the latest position in the document. For example, as shown in FIG. 2, the word processing document 202 is re-opened to the previous location (as indicated by scroll bar 212) and the position of the cursor 210 is set to the position that it was at just before termination of the session. If the web browser supports the restart management APIs of the OS, the web browser 208 can be relaunched with the tabs 216 that were open before the termination of the session.

For applications that don't support the Restart Manager API, the agent can automatically launch them with the last arguments they were launched in the original session. In some cases, this simplistic approach is not enough because it may lose the application state (e.g. a user was working on a specific file in a specific location). As an alternative, instead of launching the process with the original arguments, the system can present a window with the last screenshot of the application window (before the original user session was terminated). The system will indicate that this is a screenshot and not a live application by applying a visual effect to the screenshot (e.g. showing the screenshot in grayscale). Additionally, on top of this screenshot, the user will have a list of files he opened using the "Open File" dialog within this application. With one click, the user can launch these files back in the same application.

In the example illustrated, assuming that Notepad is an application that does not support the restart management APIs of the OS, the last notepad screenshot 206 (which was captured just prior to terminating the previous session) is presented in grayscale with a "play" button 214 indicating which document will be opened if it is pressed. Additionally, the screenshot can indicate the last file that was open at the time that the screenshot was captured (e.g., "todo 30.06.2015.txt"). If the user clicks on the play button 214, the application will be launched using the "Open File" dialog using the file paths that were recorded by the agent when the agent was intercepting and recording file open requests from the application.

In various embodiments, all windows will be opened in the same location on the screen where the corresponding windows were located just prior to termination of the session. The agent can set these locations when re-opening the windows based on the locations of the windows that were recorded before session termination.

Figure 3:
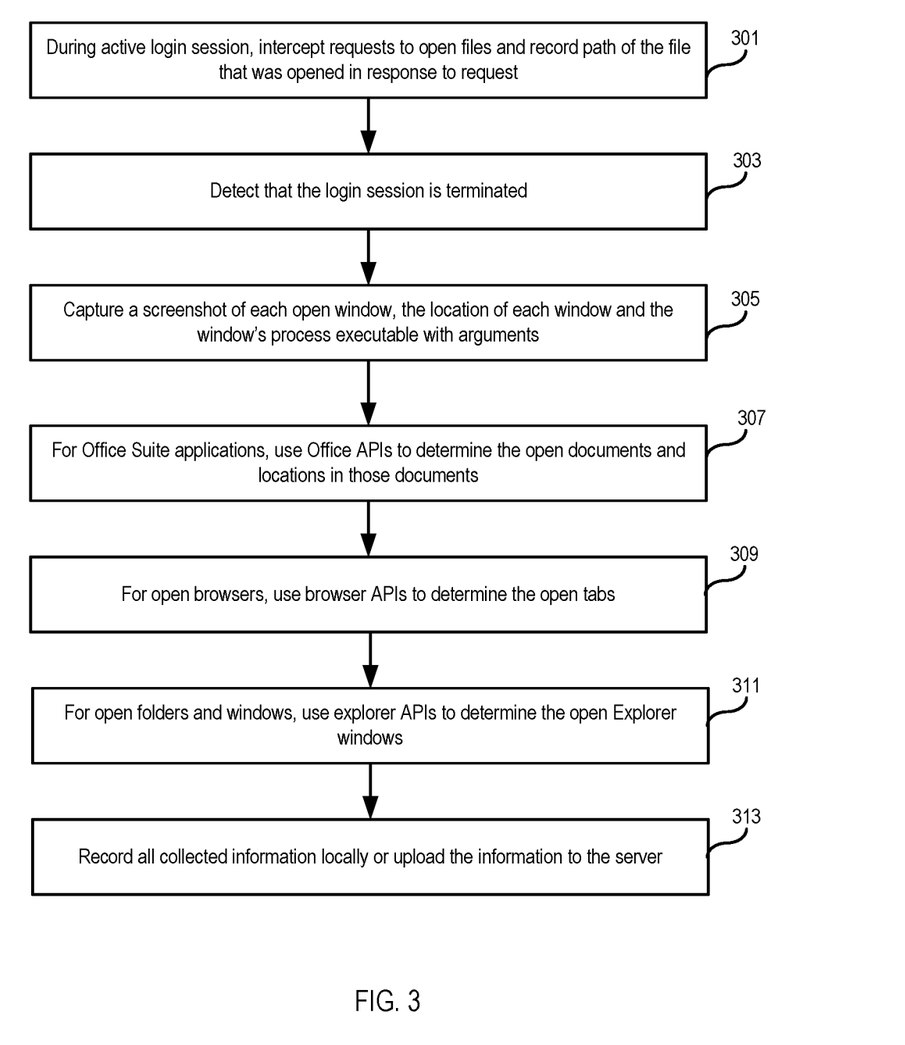
FIG. 3 illustrates an example of a process for recording the information that can be used to restore the desktop state of a login session, in accordance with various embodiments.

FIG. 3 illustrates an example of a process for recording the information that can be used to restore the desktop state of a login session, in accordance with various embodiments. As shown in operation 301, during an active login session, the system intercepts all requests to open files and records the path of the file that was opened in response to the request. In one embodiment, this function is performed by an agent software that utilizes a filter driver to intercept file open requests from the application to the operating system.

In operation 303, the system detects that the login session is being terminated. The following operations (305, 307, 309, 311, 313) are all executed prior to the termination of the session. Namely, before termination of the session, the agent captures a screenshot of each open window and records the snapshot, as shown in operation 305. The snapshot can be recorded locally or sent to a remote server. In addition, the agent records the location of each window (e.g., the window's XY coordinates on the screen) and the window's process executable (along with the process launch arguments).

In operation 307, for any open office suite applications, the agent uses office software APIs to determine any documents that are open and the locations in those documents (e.g., cursor position). In operation 309, for any open browsers, the agent uses browser-specific APIs to determine all open tabs (e.g., including IP addresses of web sites) in each open browser. In operation 311, for any open folders and windows, the agent software uses explorer APIs to determine which folders and windows are open. All of this collected information is recorded locally or uploaded to a server, as shown in operation 313.

Figure 4:
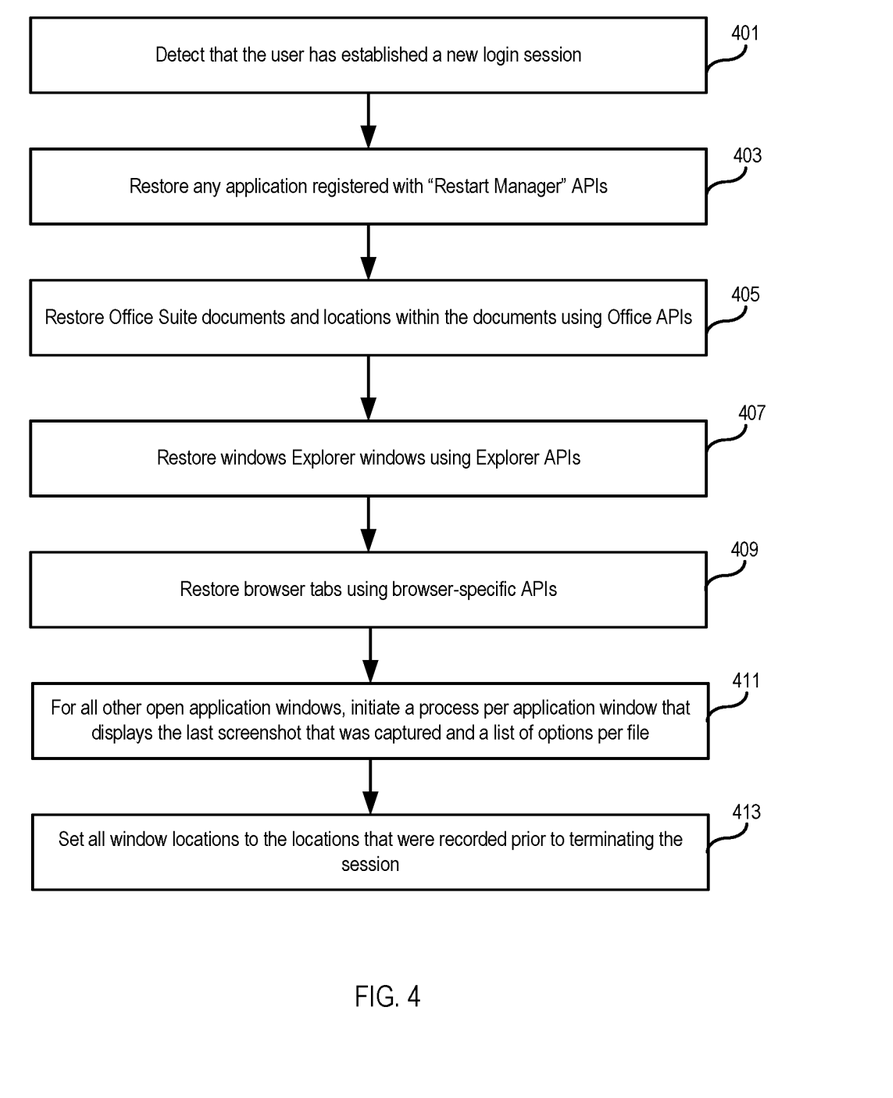
FIG. 4 illustrates an example of a process for restoring the desktop state of during a new login session, in accordance with various embodiments.

FIG. 4 illustrates an example of a process for restoring the desktop state of during a new login session, in accordance with various embodiments. When the user logs into the desktop again after the termination of the session, the system detects that a new login session has been established, as shown in operation 401. At this time, the agent software will use the previously collected information to restore the session.

In operation 403, the agent restores any application that is registered with the restart management APIs of the OS (e.g., Microsoft Restart Manager API). In operation 405, the agent restores Office documents and the location within the document using the Office software APIs. In operation 407, the agent restores any open windows or folders (e.g., Microsoft Windows Explorer windows). In operation 409, the agent restores browser tabs using the browser-specific APIs. In operation 411, for other application windows, the agent starts its own process per application window, showing the last screenshot of the app and a list of options per file that was originally opened in the last session by that application. Clicking one of the options will launch the application with the selected file. In operation 413, the agent software sets windows locations properly based on the locations that were recorded prior to session termination.

Figure 5A:
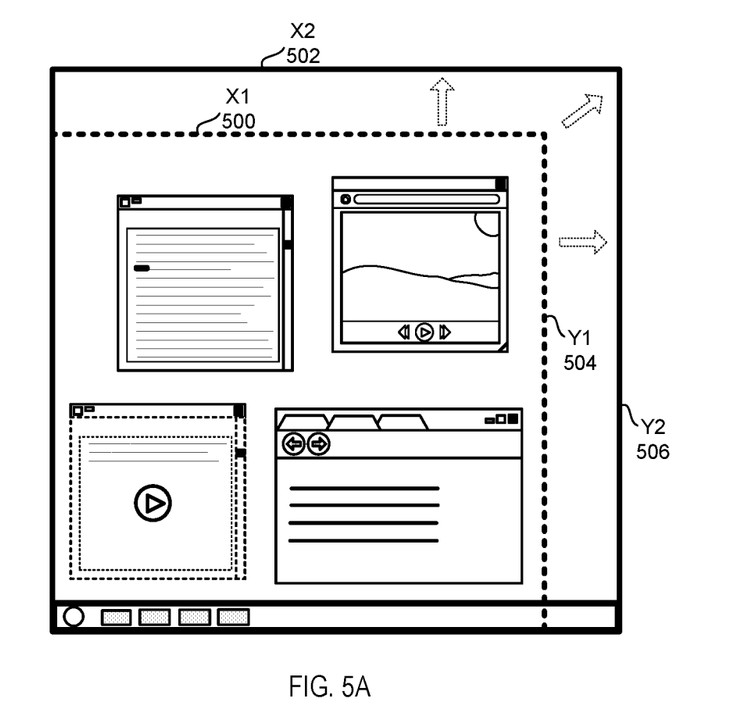
FIG. 5A illustrates an example of restoring the desktop state with resolution changes, in accordance with various embodiments.
Figure 5B:
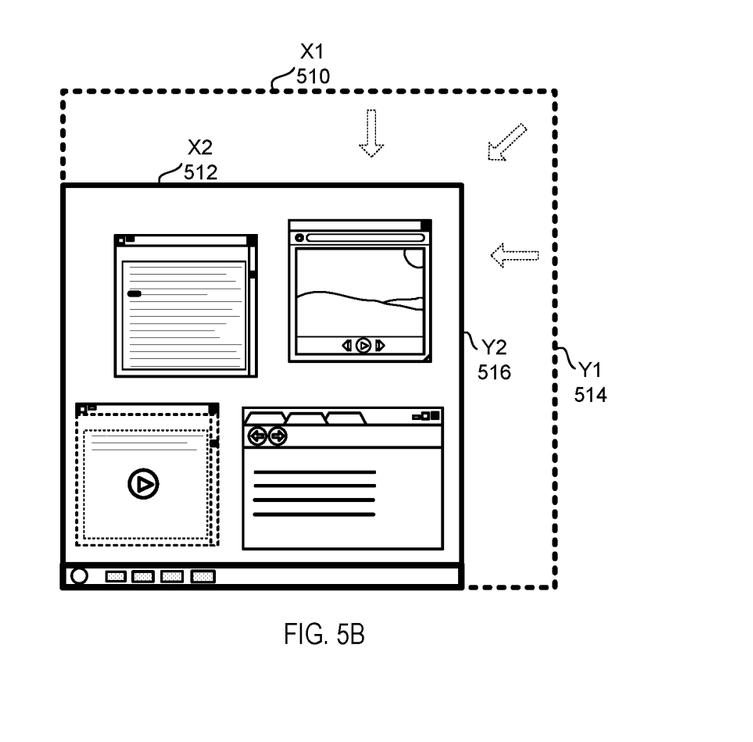
FIG. 5B illustrates another example of restoring the desktop state with resolution changes, in accordance with various embodiments.

FIGS. 5A and 5B illustrate examples of restoring the desktop state after resolution changes, in accordance with various embodiments. In most cases, the resolution does not change between login sessions. However, in some situations, the desktop resolution in the new login session may be different from the resolution of the previously terminated session, which may affect the window locations that were previously recorded. In these situations, the restore logic can arrange the windows in a heuristic way which puts them in a visually similar location to the respective locations in the prior session. FIG. 5A illustrates an example where the new resolution is increased from X1 500 to X2 502 and from Y1 504 to Y2 506, where X1 is less than X2 and where Y1 is less than Y2. In this scenario where the resolution has increased, the restore logic can simply use a subset of the new screen resolution to present the windows in the same locations. Alternatively in other embodiments, the restore logic may adjust the locations and the sizes of the windows (not shown) to account for the increased resolution. This may be advantageous where the resolution has changed significantly such that the previous locations may appear visually to be in the incorrect locations for the user. FIG. 5B illustrates an example where the new resolution is decreased from X1 510 to X2 512 and from Y1 514 to Y2 516, where X1 is greater than X2 and Y1 is greater than Y2. In this situation, the restore logic changes the window locations and/or sizes accordingly to account for the decreased resolution (effectively, squeezing in the windows in the same places as the previous login session). For example, if X2 and Y2 are 10% smaller than X1 and Y1 respectively, then the sizes of each window may be reduced by 10% accordingly and the positions of each window may be shifted to account for the reduction as well.

Figure 6:
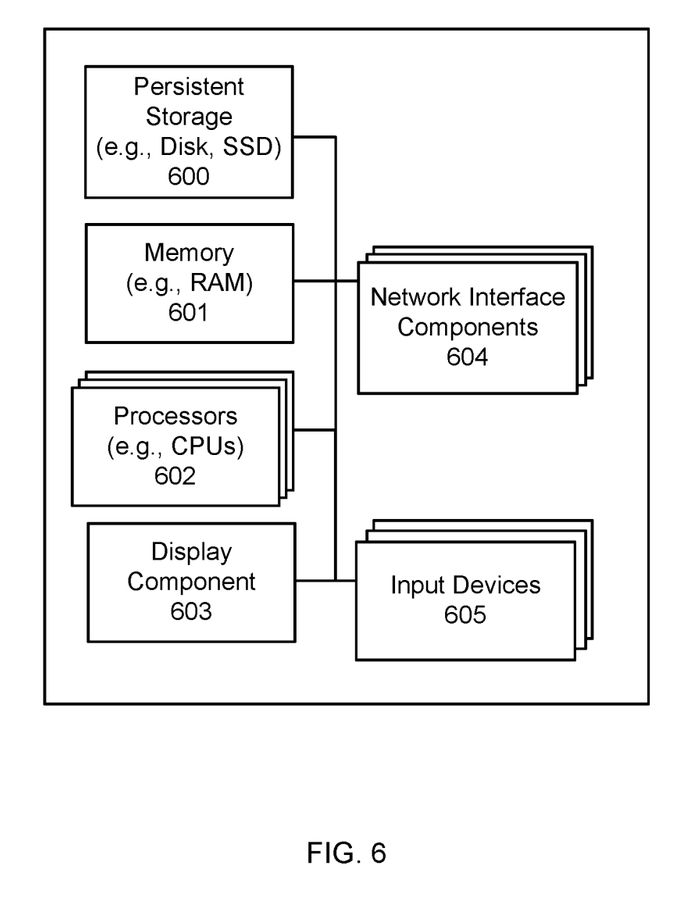
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for preserving desktop state, the method comprising:
   in response to detecting that a desktop login session is being terminated,
      capturing a screenshot of a window of an application that is open on a desktop at the time of detecting the desktop login session being terminated;
      determining a location of the window on the desktop; and
      storing the screenshot and the location of the window;
   in response to detecting that a new desktop login session is being started,
      determining whether the application supports a set of restart management application programming interfaces (APIs) provided by an operating system; and
      in response to determining that the application does not support the set of restart management APIs, restoring a state of the desktop login session by displaying the stored screenshot in the location of the window and applying a visual effect to the window to indicate that the window is the screenshot and not a live running application.

2. The method of claim 1, further comprising:
   intercepting a request to open a file during the desktop login session prior to detecting that the desktop login session is being terminated; and
   in response to detecting that the desktop login session is being terminated, recording a path of the file that was opened in response to the request.

3. The method of claim 2, further comprising:
   in response to detecting that the new desktop login session is being started, restoring the state of the desktop login session based on the recorded path of the file.

4. The method of claim 1, further comprising:
   in response to detecting that the new desktop login session is being started, re-opening the window that was open on the desktop at the time of detecting the desktop login session being terminated and setting a location of the re-opened window to the stored location.

5. The method of claim 1, further comprising:
   recording a position of a scroll bar in an open document in response to detecting that the desktop login session is being terminated; and
   wherein restoring the state of the desktop login session further includes re-opening the document and scrolling to the recorded position of the scroll bar within the document.

6. The method of claim 1, wherein restoring the state of the desktop login session further comprises:
   displaying the stored screenshot of the application with an option to launch the application that is displayed in the stored screenshot.

7. The method of claim 1, further comprising:
   in response to detecting that the new desktop login session is being started,
      determining that a screen resolution of the new desktop login session is different from a screen resolution prior to terminating the desktop login session;
      modifying a size of the window based on a difference between the screen resolution of the new desktop login session and the screen resolution prior to terminating the desktop login session; and
      shifting a position of the window during restoring the state of the desktop login session to account for the difference between the screen resolution of the new desktop login session and the screen resolution prior to terminating the desktop login session.

8. A computing device, comprising:
   at least one processor; and
   memory including instructions that, when executed by the at least one processor, cause the computing device to:
      in response to detecting that a desktop login session is being terminated,
         capture a screenshot of a window of an application that is open on a desktop at the time of detecting the desktop login session being terminated;
         determine a location of the window on the desktop; and
         store the screenshot and the location of the window;
      in response to detecting that a new desktop login session is being started,
         determining whether the application supports a set of restart management application programming interfaces (APIs) provided by an operating system; and
         in response to determining that the application does not support the set of restart management APIs, restore a state of the desktop login session by displaying the stored screenshot in the location of the window and applying a visual effect to the window to indicate that the window is the screenshot and not a live running application.

9. The computing device of claim 8, wherein the memory further includes instructions that when executed by the at least one processor, cause the computing device to:
   intercept a request to open a file during the desktop login session prior to detecting that the desktop login session is being terminated; and
   in response to detecting that the desktop login session is being terminated, record a path of the file that was opened in response to the request.

10. The computing device of claim 9, wherein the memory further includes instructions that when executed by the at least one processor, cause the computing device to:
    in response to detecting that the new desktop login session is being started, restore the state of the desktop login session based on the recorded path of the file.

11. The computing device of claim 8, wherein the memory further includes instructions that when executed by the at least one processor, cause the computing device to:
    in response to detecting that the new desktop login session is being started, re-open the window that was open on the desktop at the time of detecting the desktop login session being terminated and set a location of the re-opened window to the stored location.

12. The computing device of claim 8, wherein the memory further includes instructions that when executed by the at least one processor, cause the computing device to:
    record a position of a scroll bar in an open document in response to detecting that the desktop login session is being terminated; and
    wherein restoring the state of the desktop login session further includes re-opening the document and scrolling to the recorded position of the scroll bar within the document.

13. The computing device of claim 8, wherein restoring the state of the desktop login session further comprises:

displaying the stored screenshot of the application with an option to launch the application that is displayed in the stored screenshot.

14. The computing device of claim 8, wherein the memory further includes instructions that when executed by the at least one processor, cause the computing device to:
in response to detecting that the new desktop login session is being started,
determine that a screen resolution of the new desktop login session is different from a screen resolution prior to terminating the desktop login session;
modify a size of the window based on a difference between the screen resolution of the new desktop login session and the screen resolution prior to terminating the desktop login session; and
shift a position of the window during restoring the state of the desktop login session to account for the difference between the screen resolution of the new desktop login session and the screen resolution prior to terminating the desktop login session.

15. A non-transitory computer readable storage medium comprising one or more sequences of instructions, the instructions when executed by one or more processors causing the one or more processors to execute the operations of:
in response to detecting that a desktop login session is being terminated,
capturing a screenshot of a window of an application that is open on a desktop at the time of detecting the desktop login session being terminated;
determining a location of the window on the desktop; and
storing the screenshot and the location of the window;
in response to detecting that a new desktop login session is being started,
determining whether the application supports a set of restart management application programming interfaces (APIs) provided by an operating system; and
in response to determining that the application does not support the set of restart management APIs, restoring a state of the desktop login session by displaying the stored screenshot in the location of the window and applying a visual effect to the window to indicate that the window is the screenshot and not a live running application.

16. The non-transitory computer readable storage medium of claim 15, further comprising instructions that when executed by the one or more processors cause the one or more processors to execute the operations of:
intercepting a request to open a file during the desktop login session prior to detecting that the desktop login session is being terminated; and
in response to detecting that the desktop login session is being terminated, recording a path of the file that was opened in response to the request.

17. The non-transitory computer readable storage medium of claim 16, further comprising instructions that when executed by the one or more processors cause the one or more processors to execute the operations of:
in response to detecting that the new desktop login session is being started, restoring the state of the desktop login session based on the recorded path of the file.

18. The non-transitory computer readable storage medium of claim 15, further comprising instructions that when executed by the one or more processors cause the one or more processors to execute the operations of:
in response to detecting that the new desktop login session is being started, re-opening the window that was open on the desktop at the time of detecting the desktop login session being terminated and setting a location of the re-opened window to the stored location.

19. The non-transitory computer readable storage medium of claim 15, further comprising instructions that when executed by the one or more processors cause the one or more processors to execute the operations of:
recording a position of a scroll bar in an open document in response to detecting that the desktop login session is being terminated; and
wherein restoring the state of the desktop login session further includes re-opening the document and scrolling to the recorded position of the scroll bar within the document.

20. The non-transitory computer readable storage medium of claim 15, further comprising instructions that when executed by the one or more processors cause the one or more processors to execute the operations of:
in response to detecting that the new desktop login session is being started,
determining that a screen resolution of the new desktop login session is different from a screen resolution prior to terminating the desktop login session;
modifying a size of the window based on a difference between the screen resolution of the new desktop login session and the screen resolution prior to terminating the desktop login session; and
shifting a position of the window during restoring the state of the desktop login session to account for the difference between the screen resolution of the new desktop login session and the screen resolution prior to terminating the desktop login session.

* * * * *